Nov. 2, 1965　　R. L. KOSSAN ETAL　　3,215,040
ADAPTER RAIL

Filed March 26, 1963　　17 Sheets-Sheet 2

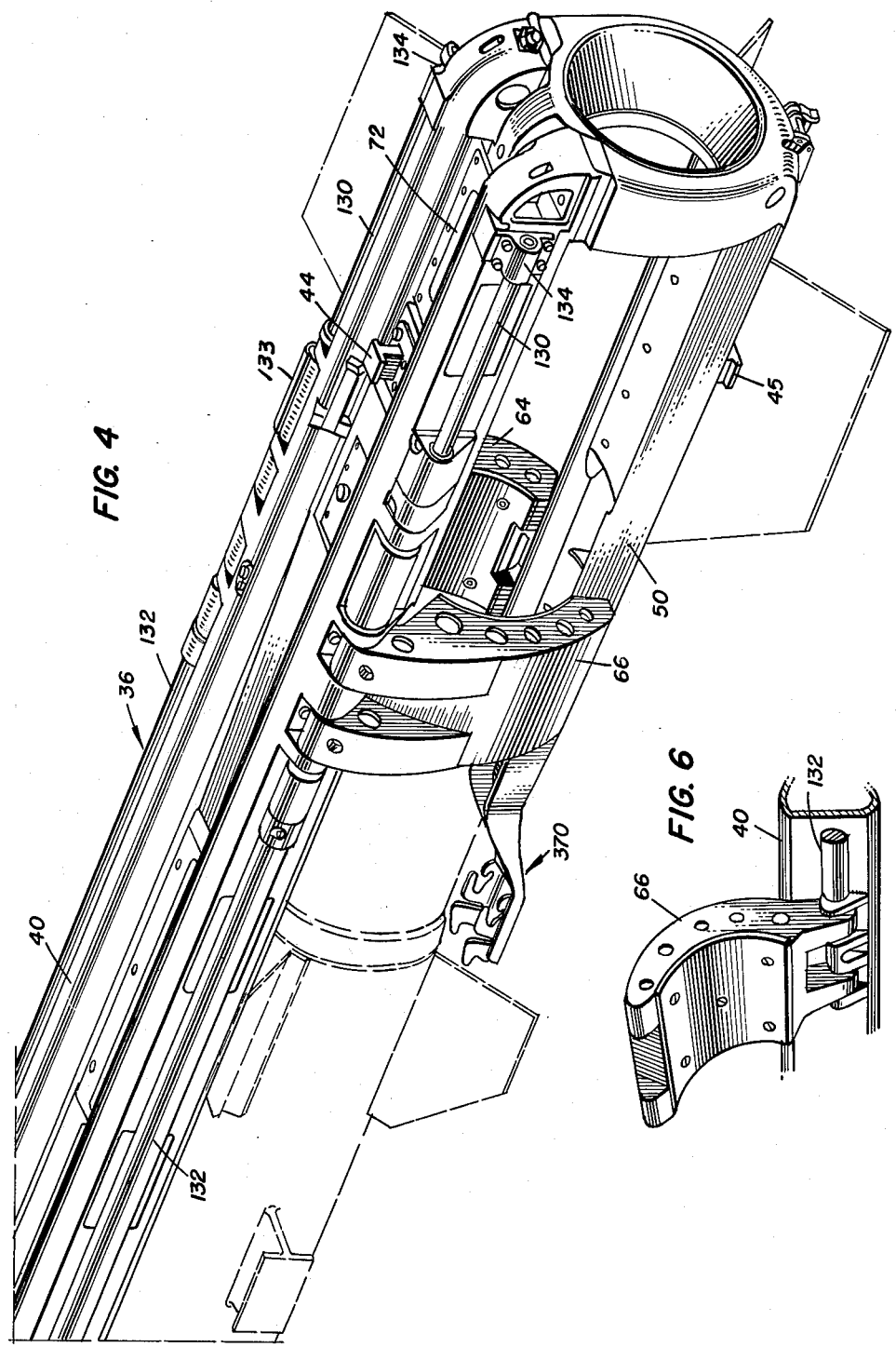

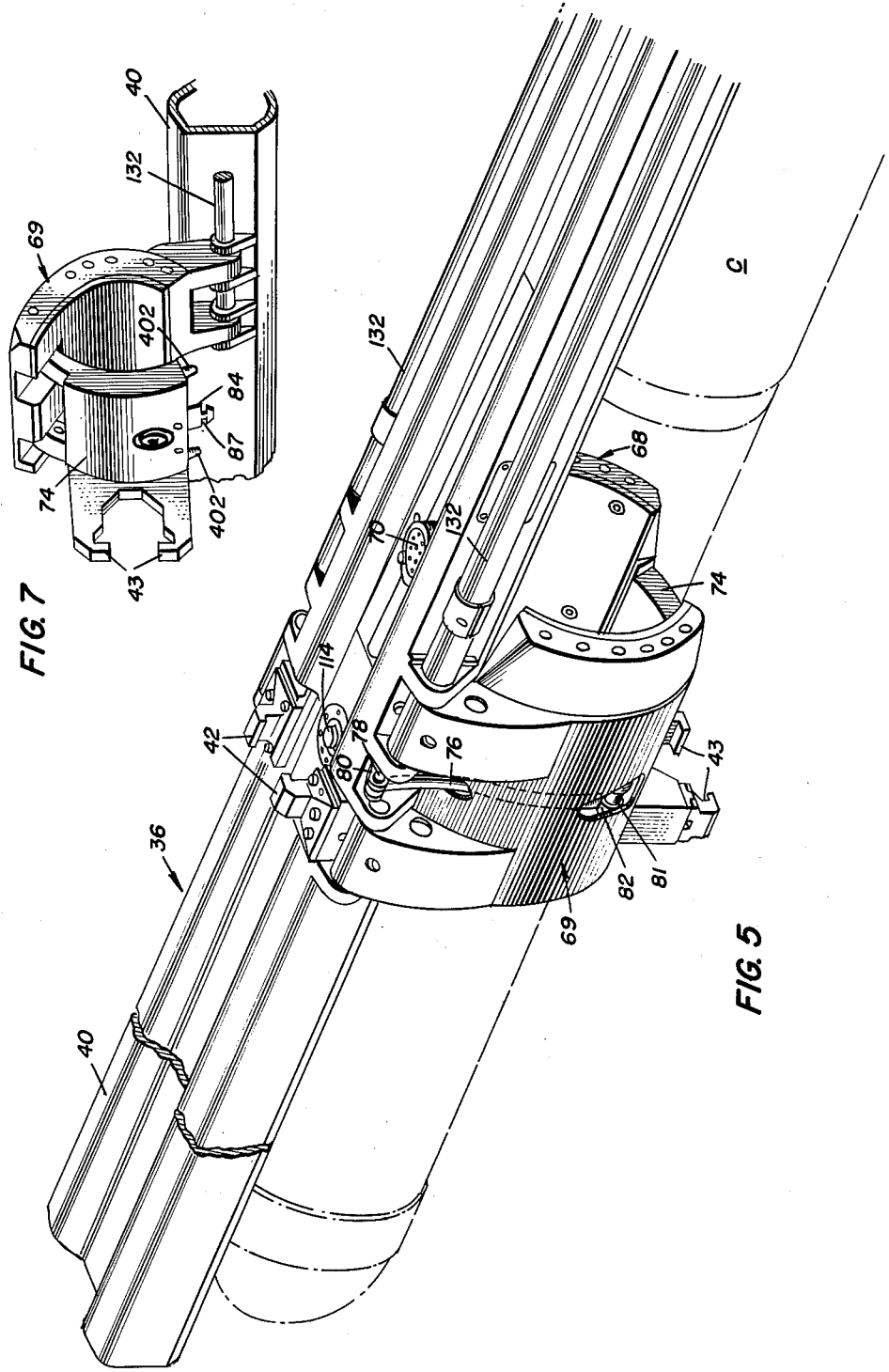

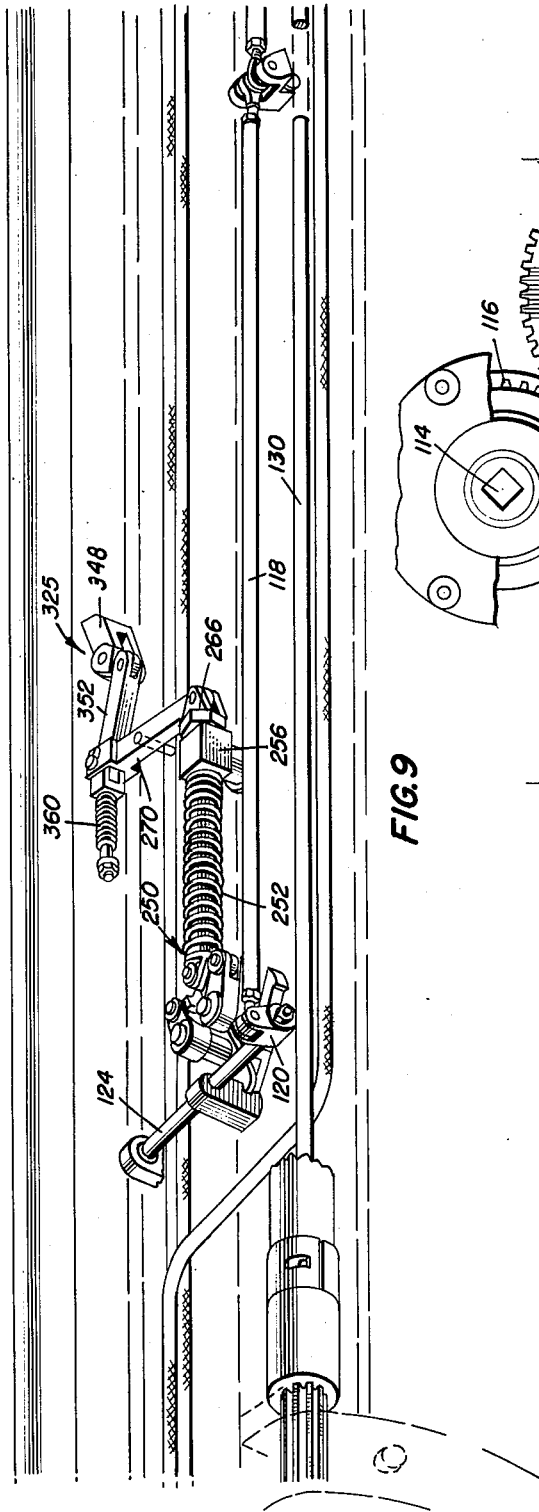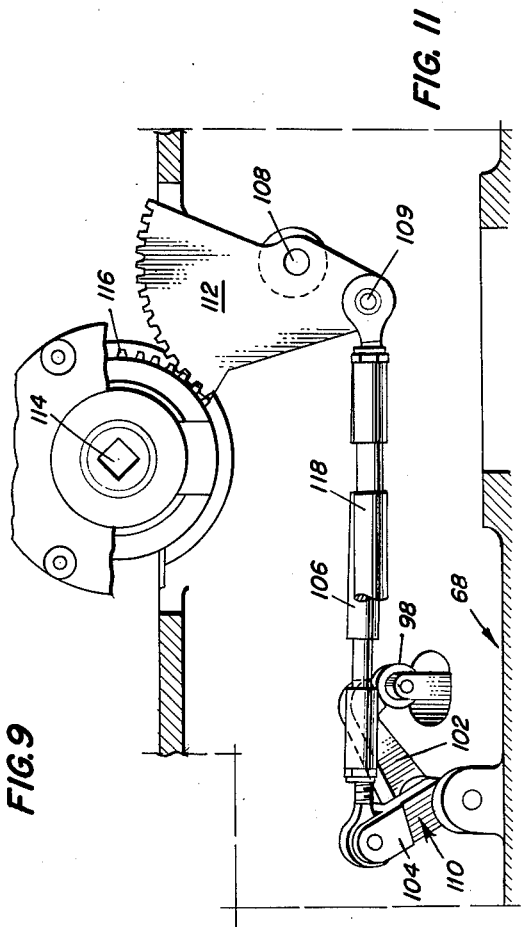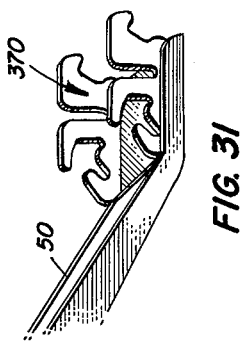

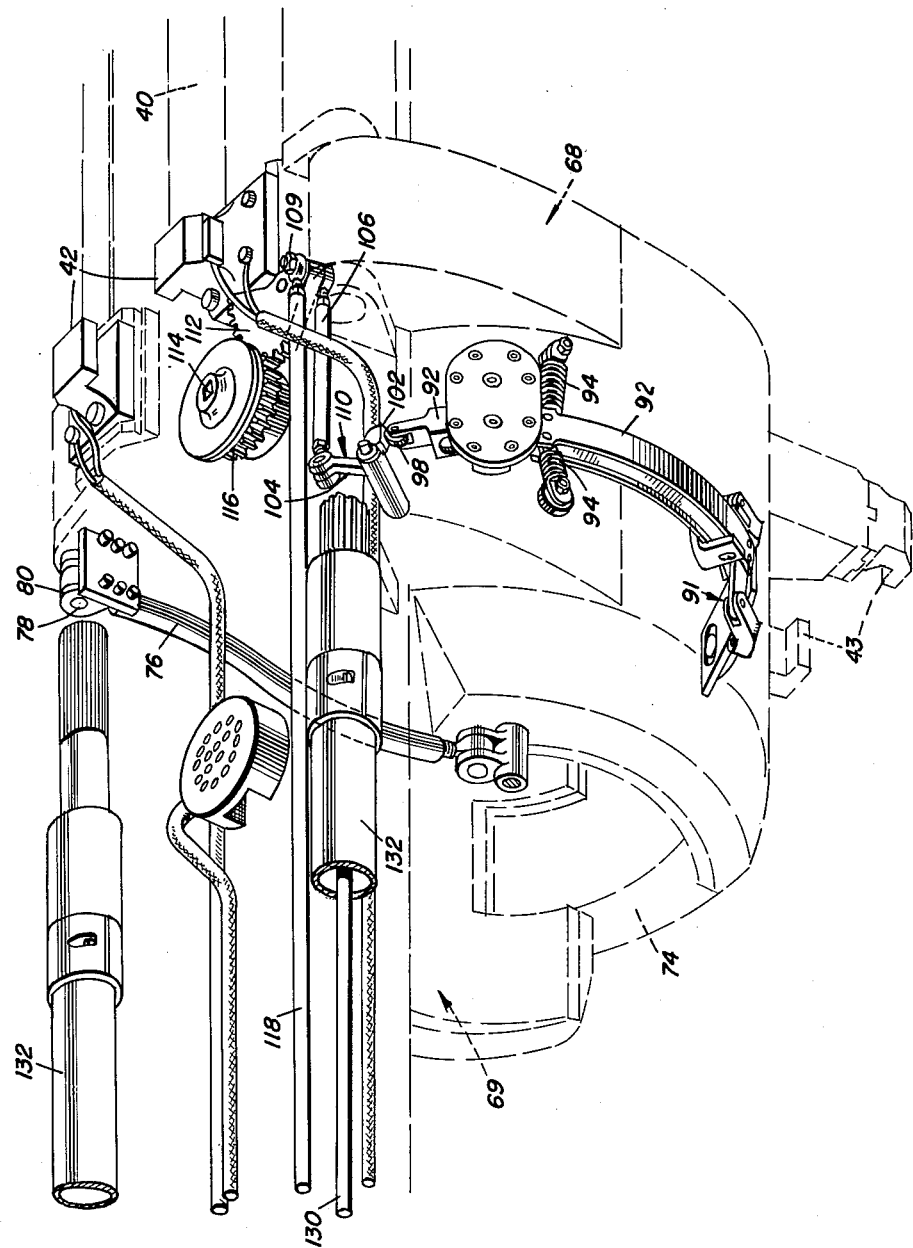

Nov. 2, 1965 R. L. KOSSAN ETAL 3,215,040
ADAPTER RAIL
Filed March 26, 1963 17 Sheets-Sheet 10

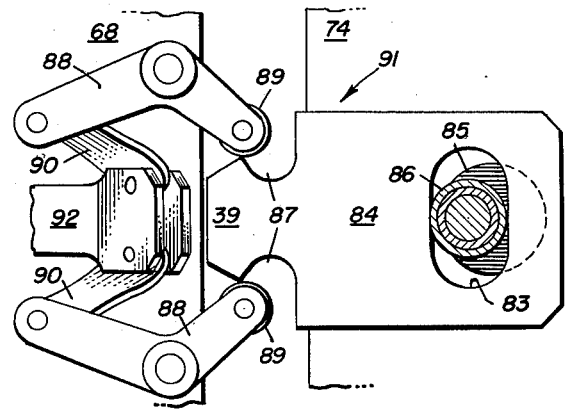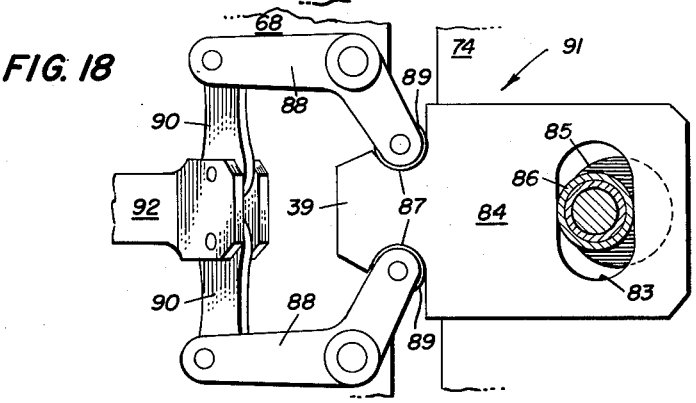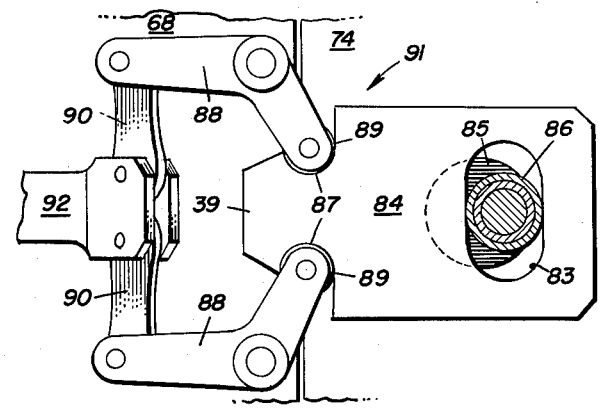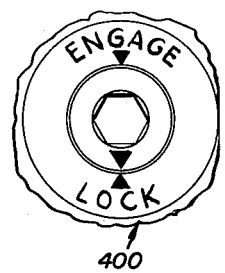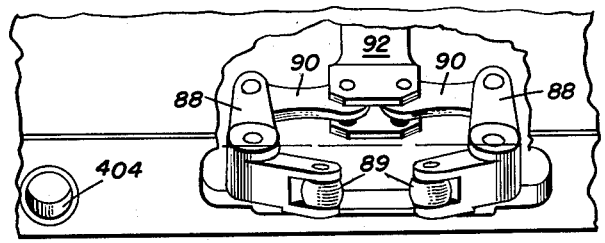

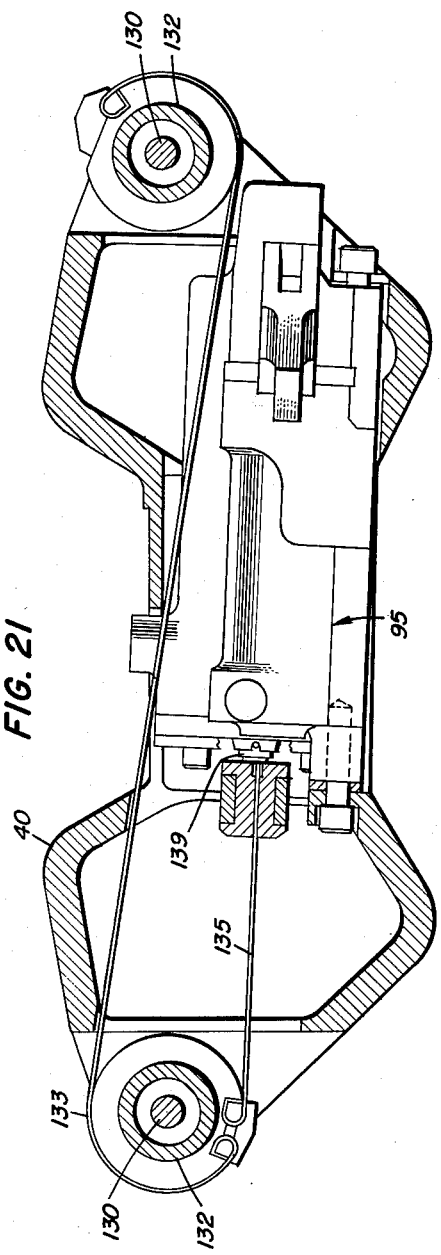
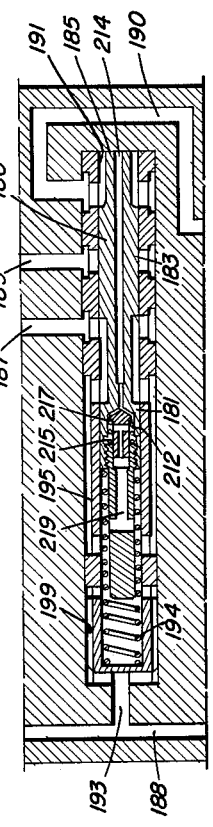

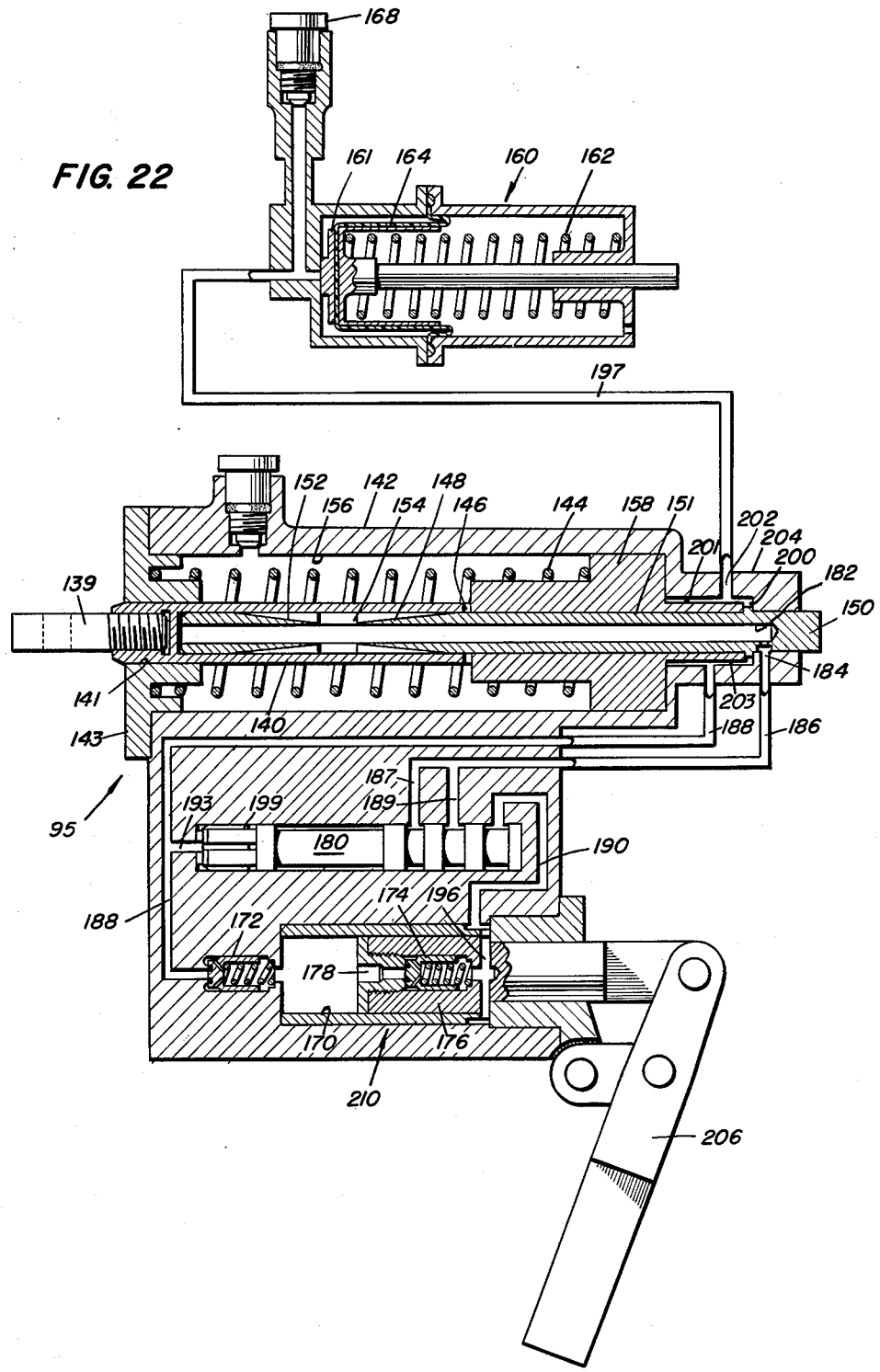

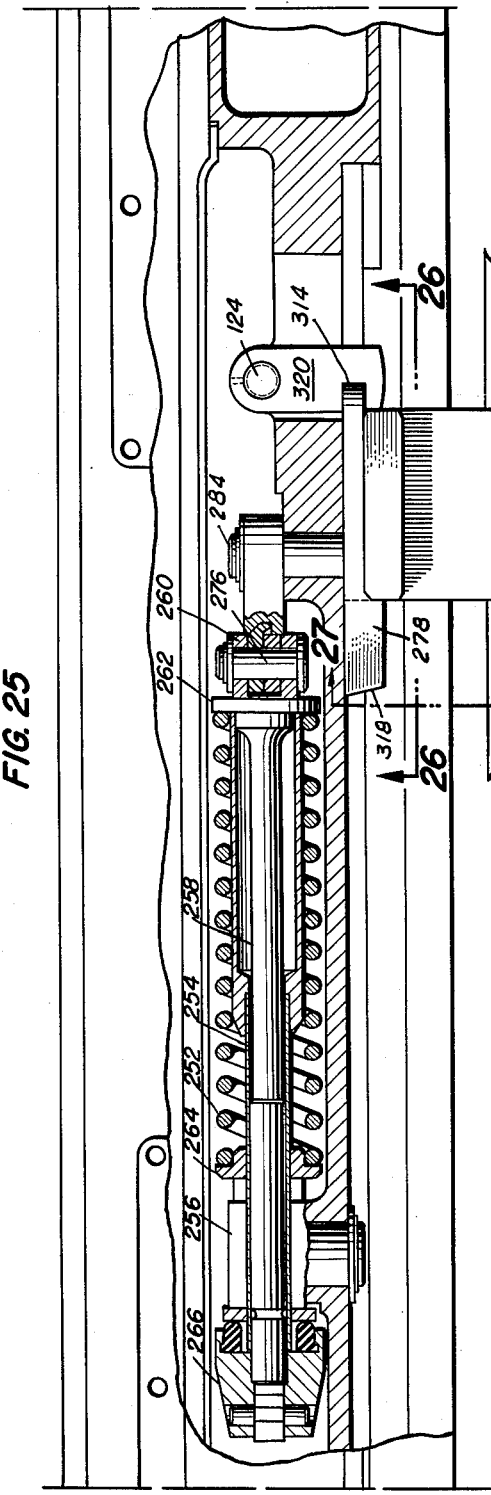
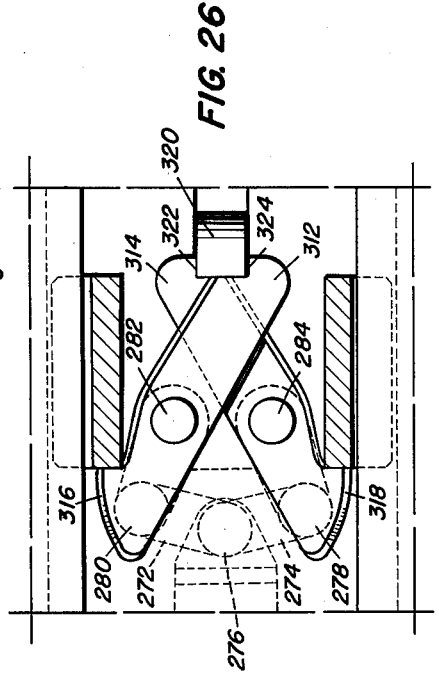
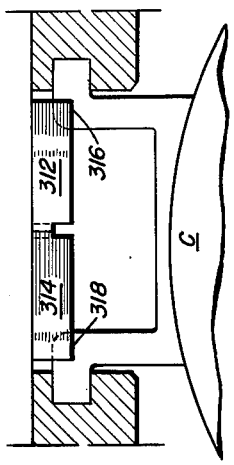

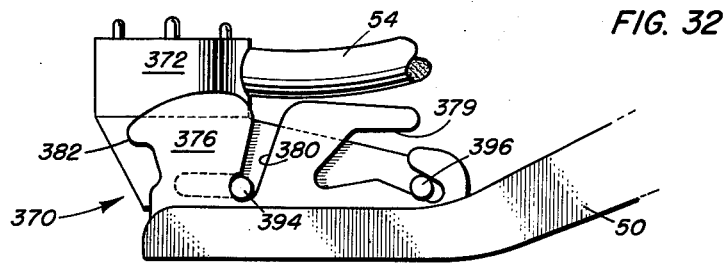
FIG. 32
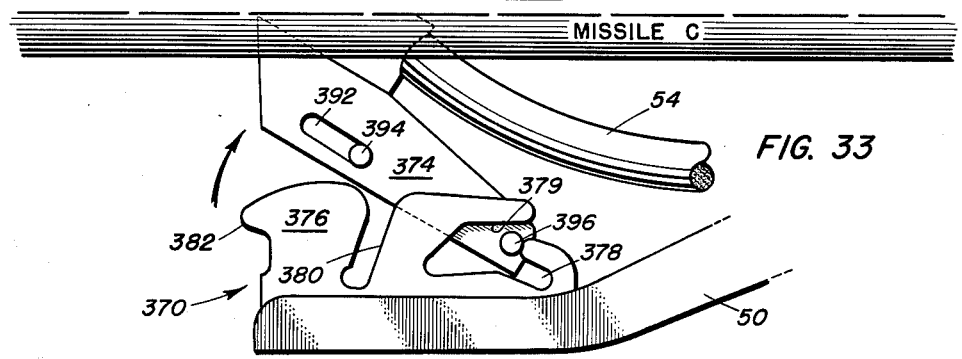
FIG. 33
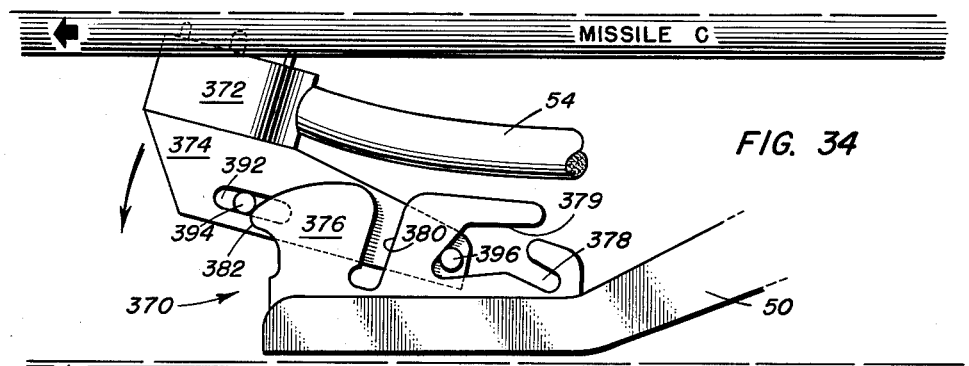
FIG. 34
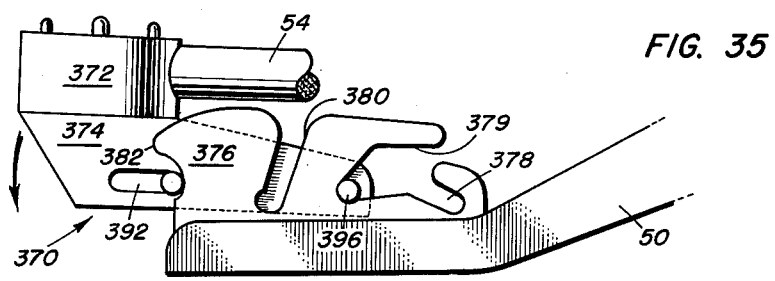
FIG. 35

3,215,040
ADAPTER RAIL
Robert L. Kossan, Adelphi, Md., Robert E. Carlberg, McLean, Va., Louis H. Weber, Rockville, and Richard H. Allen, Beltsville, Md., and Palmer G. Wermager, Minneapolis, John L. Scheurich, Excelsior, and Bertram J. Matson, Minneapolis, Minn., assignors, by direct and mesne assignments, to the United States of America as represented by the Secretary of the Navy
Filed Mar. 26, 1963, Ser. No. 268,496
8 Claims. (Cl. 89—1.7)

This invention relates to missile launchers and more particularly to an adapter rail for use in such launchers.

Heretofore, in the field of missile launchers, it has generally been found necessary to develop a different launching system for each different size or type of missile according to the particular needs of each missle. Variations in size of missiles has been a particularly perplexing problem because it requires not only the development of a new system but also the redesign of each individual component within the system. That is to say, when a new type of missile is developed, a launching system can be designed and constructed by using the existing components of another launching system for a different missile which is of the same or similar configuration and size. However, when a missile is developed which is not only of a different type but also of a different size and configuration, the existing components, e.g., magazine and launcher, cannot be used. Thus, it becomes necessary to develop a new system with new components for this last-mentioned missile.

In addition to the difference in physical requirements, the newly designed missile may have other characteristics that are different from those of the original missile. For example, the new missile may require a longer length of travel before it can sustain stable free flight. That is, the rails on the launcher arm may provide a given length of guided travel which was adequate to permit the original missile to sustain stable free flight, but that length of guided travel would not be sufficient to allow the new missile to attain free flight in a stable manner. Since the launcher arm does not have adequately long rails, it could not be used for the new missile even if the physical configuration of the new missile were identical with the original missile, i.e. the missile for which the system, and thus the launcher arm, was designed.

It is, therefore, an object of the present invention to provide a means for adapting a missile of a given size and type for use in a launching system which was intended for launching a missile of a different type and size.

Another object of the present invention is to provide an adapter rail which will adapt a given missile for use in a launching system designed to launch a different missile and which is reusable.

Still another object of the present invention is to provide an adapter rail which will rigidly and safely secure a given missile thereto and transport that missile throughout a launching system designed for another missile and which will serve as a launching guide rail for the given missile when the same is launched.

Another object is to provide a means that will permit a longer length of guided travel for a given missile than that travel of which the launcher arm is capable of providing and thus, allow the missile to attain a stable free flight.

A further object of the present invention is to provide an adapter rail which will mechanically restrain a given missile as the same is transported from the magazine to the launcher arm in a launching system designed for another missile and, when the given missile is positioned on the launcher arm, will remove some of the mechanical restraints until the given missile is fired and when sufficient thrust has been developed the remaining restraints will be overcome.

A further object is the provision of a restraining device that is both positive and releasable upon exertion of a predetermined amount of force therebetween.

Another object is to provide a means for arming a missile secured on an adapter rail.

A further object is to provide a means for disconnecting the umbilical cord from a missile as the same is launched.

A still further object is to provide a forward and aft snubber for holding a missile on the adapter rail and a novel torsion bar and torque tube arrangement for opening the snubbers for launching of the missile.

Another object is the provision of a novel forward snubber which will fold and thus permit the adapter to be returned to the launching system without closing the snubbers.

A still further object of the present invention is to provide a releasable latch means for locking a snubber around a missile.

A still further object is to provide a hydraulic system for controlling the torsion bars and the action of the snubbers.

Other objects and many of the attendant advantages of this invention will be readily appreciated as the same becomes better understood by reference to the following detailed description when considered in connection with the accompanying drawings wherein:

FIG. 4 is a dimetric view of the rear portion of the adapter rail with a missile secured thereby;

FIG. 5 is a dimetric view of the forward portion of the rail showing a missile secured thereby;

FIG. 6 is a dimetric view of the right arm of the aft snubber in its open position.

FIG. 7 is a dimetric view of the left arm of the forward snubber in an open position and illustrating the manner in which the arm is folded in toward the rail;

FIG. 9 is a dimetric view of a mechanical schematic of the central portion of the adapter rail;

FIG. 10 is a dimetric view of a mechanical schematic of the forward portion of the adapter rail;

FIG. 11 is a detail view of the arming tool and linkage means for the clamp release mechanism and the positive restraint release mechanism;

FIG. 17 is a bottom plan view of the forward snubber latch assembly showing the initial stage of engagement of the latch;

FIG. 17a is a view of the lock position indicator in the engage position;

FIG. 18 is a view similar to FIG. 17 in which the latch has been completely engaged;

FIG. 18a is a view similar to FIG. 17a showing the lock position indicator in engage position;

FIG. 19 is a view similar to FIGS. 17 and 18 in which the latch has been locked in position;

FIG. 19a is a view similar to FIGS. 17a and 18a in which the lock position indicator has been turned to lock position;

FIG. 20 is an edge view of the right arm of the forward snubber with parts broken away to show the latch linkage;

FIG. 21 is a cross section view taken through the rear portion of the rail and showing the buffer system;

FIG. 22 is a hydraulic schematic of the buffer system;

FIG. 23 is a detail schematic of the sequence valve and pressure relief valve in the buffer system;

FIG. 25 is a vertical section of the central portion of the rail and showing the missile restraining mechanism;

FIG. 26 is a section taken on line 26—26 of FIG. 25 and showing pawls of the missile restraining mechanism in engagement with the aft lug of the missile;

FIG. 27 is a section taken on line 27—27 of FIG. 25 and showing the engagement of the pawls with the aft lug of the missile;

FIG. 31 is a detail dimetric view of the umbilical disconnector on the cantilever beam;

FIG. 32 is a vertical elevation showing the plug and umbilical disconnector in load position;

FIG. 33 is a vertical elevation similar to FIG. 32 in which the plug is in engagement with the missile;

FIG. 34 is a vertical elevation similar to FIGS. 32 and 33 and showing the operation of the umbilical disconnector in the initial stage of disconnect; and FIG. 35 is a vertical elevation, similar to FIGS. 32 through 34, and showing the final stage of disconnect.

Figure 1:
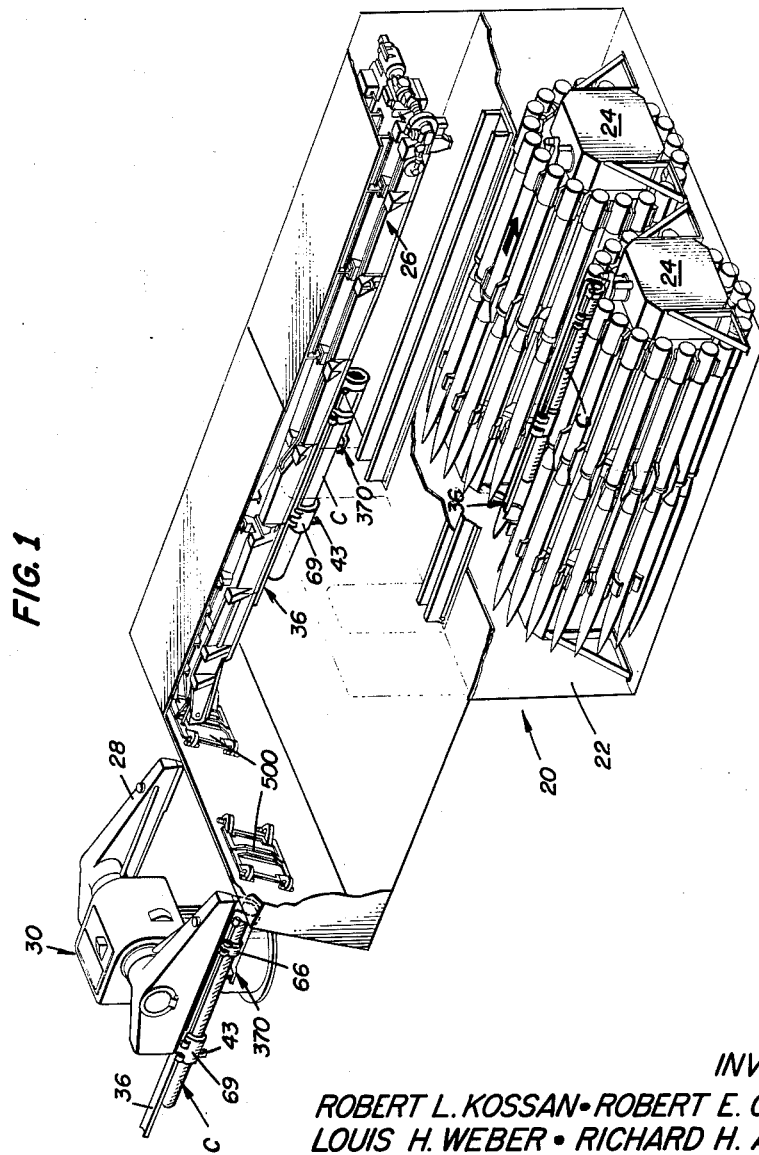
FIG. 1 is a dimetric view of a launching system with sections broken away showing the adapter rail in the system.
Figure 2:
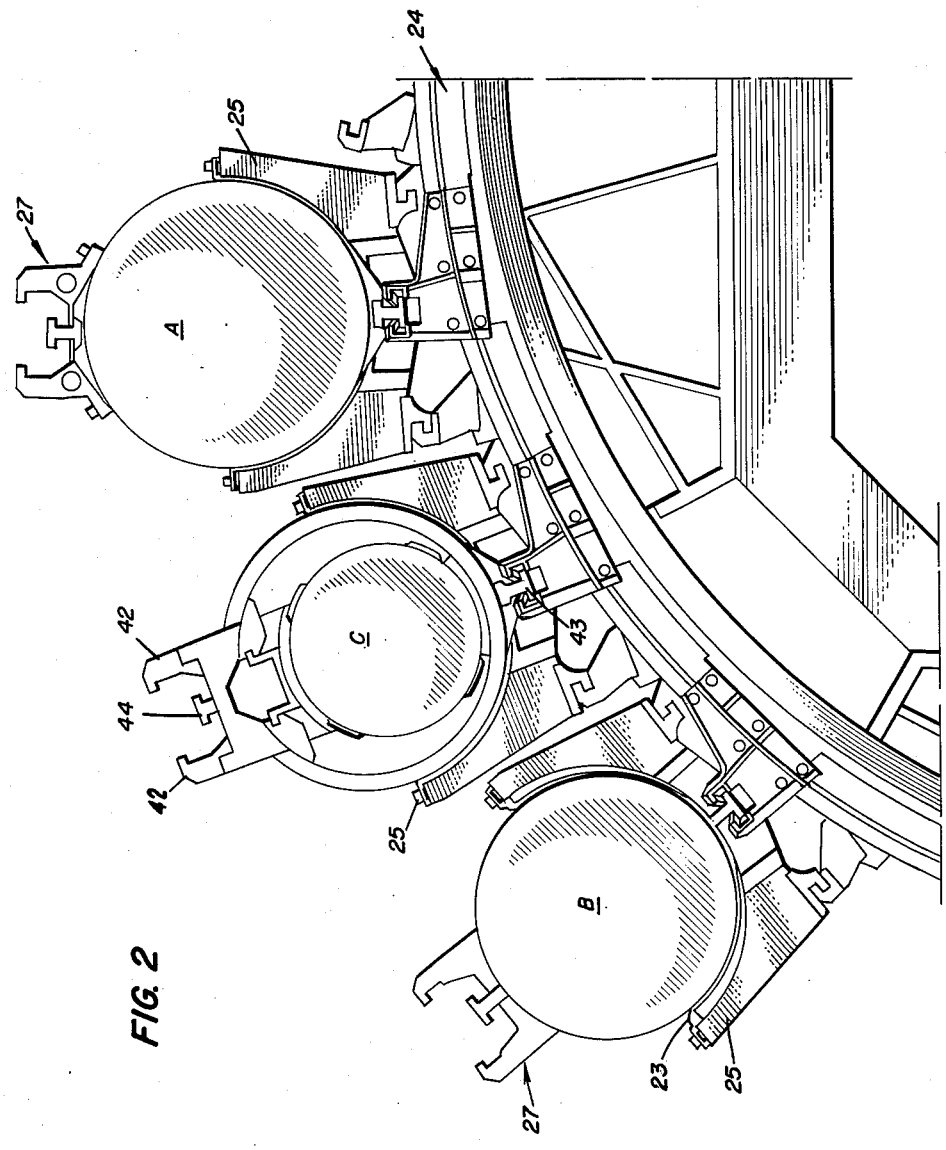
FIG. 2 is an end view of one of the ready service rings in the launching system showing three types of missiles stowed thereon.
Figure 3:
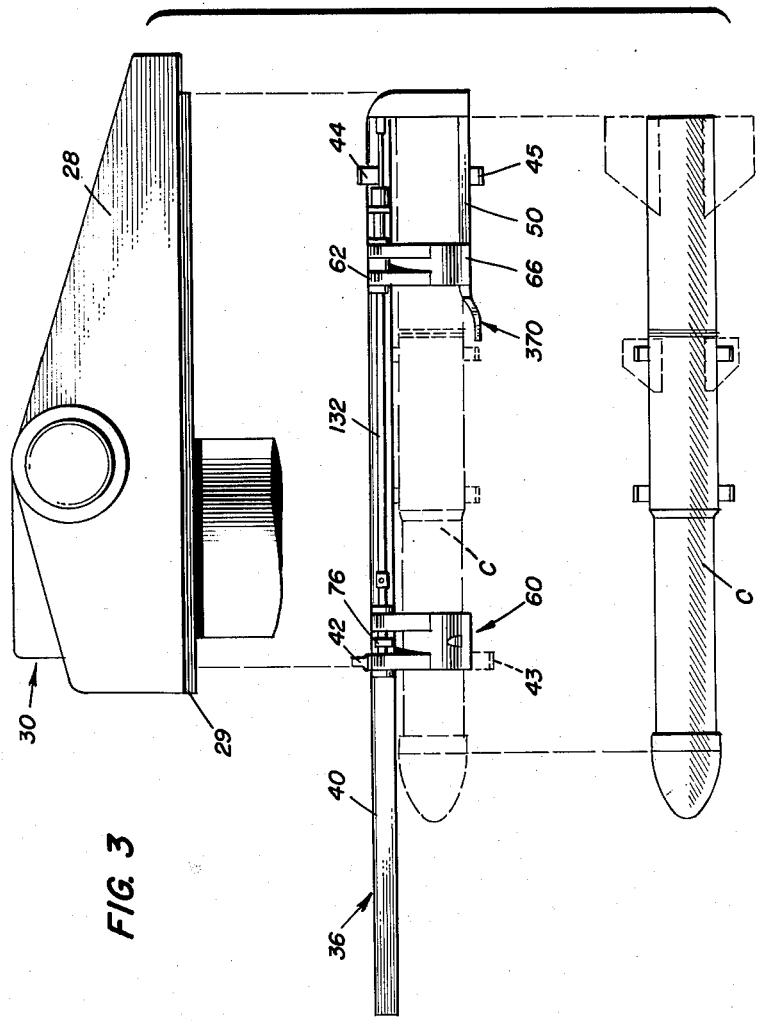
FIG. 3 is a composite view of a launcher arm illustrating the manner in which the missile is secured to the adapter rail and the adapter rail supported by the launcher arm.

Referring now to the details of the drawings, FIG. 1 shows a missile launching system 20 which by virtue of the present invention is capable of handling and launching three different types of missiles, missile A, missile B, and missile C, which are shown on the ready service ring in FIG. 2. The missile launching system 20 has a magazine room 22 having a pair of ready service rings 24 therein for storing missiles. The ready service rings 24 are capable of being rotated to bring the desired missile into a position where it can be hoisted onto a feeder mechanism 26 for transporting the missile onto the launcher arm 28 of a missile launcher 30. The missiles are held in individual trays 25 on the ready service ring. The missile launching system 20 was designed and constructed to accommodate a given missile A, and through the use of inserts 23 in the trays 25 on the ready service ring, the system can handle a missile B, which is slightly smaller but has the same lug configuration 27. A much smaller missile, such as missile C, could not be successfully fired from this system 20. However, by using the adapter rail 36 it is possible to utilize a system designed for one missile in the launching o fan entirely different missile. FIG. 1 shows the missile C engaged by an adapter rail 36 and in three different positions in system 20; on the ready service ring 24, on the feeder mechanism 26, and on the launcher arm 28.

The relationship of the missile C to the adapter rail 36 and the rail's relationship to the track 29 of the launching system, as represented by the launcher arm 28, is shown in an expanded view.

Figure 8:
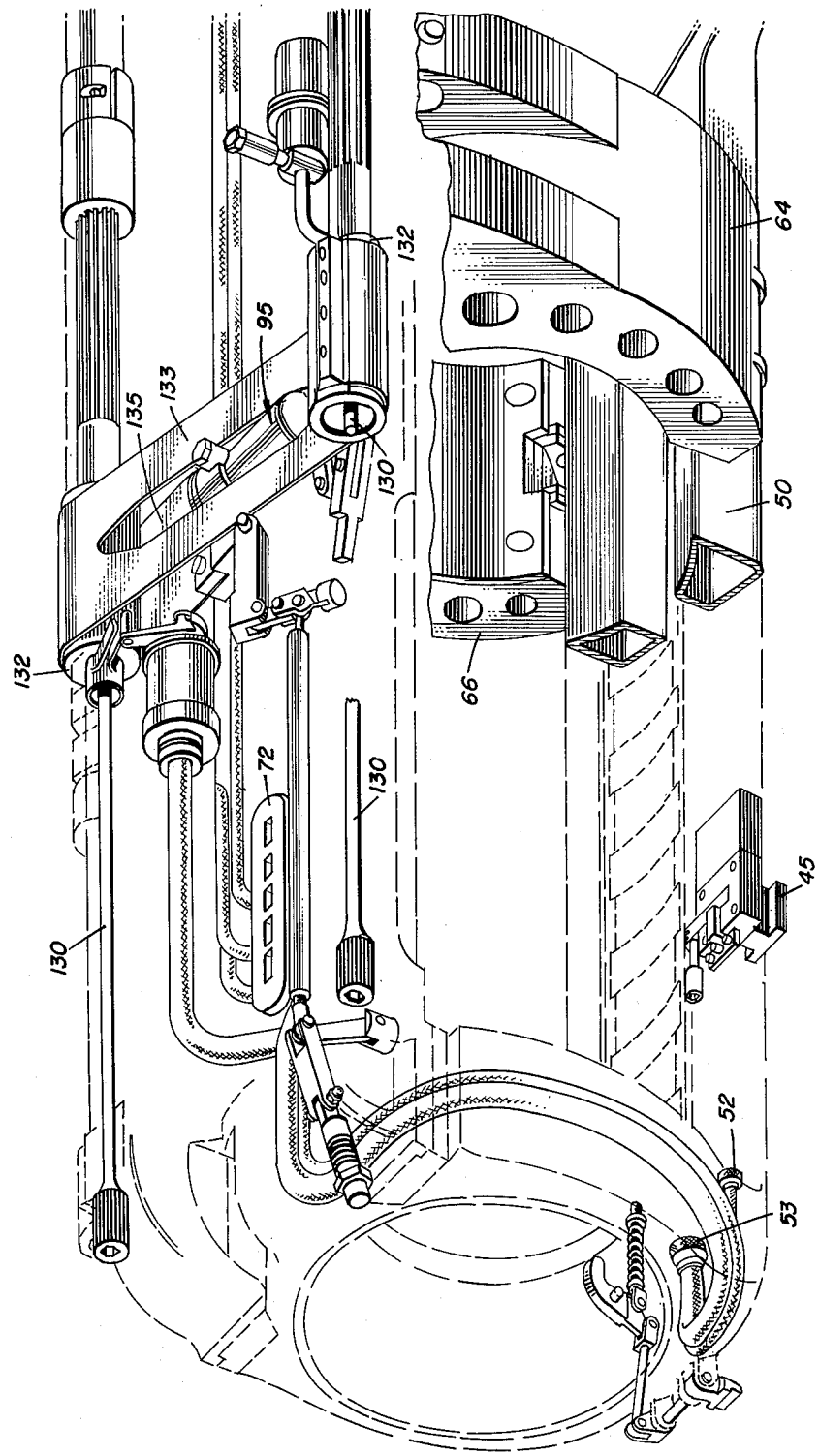
FIG. 8 is a dimetric view of a mechanical schematic of the rear portion of the adapter rail.
Figure 12:
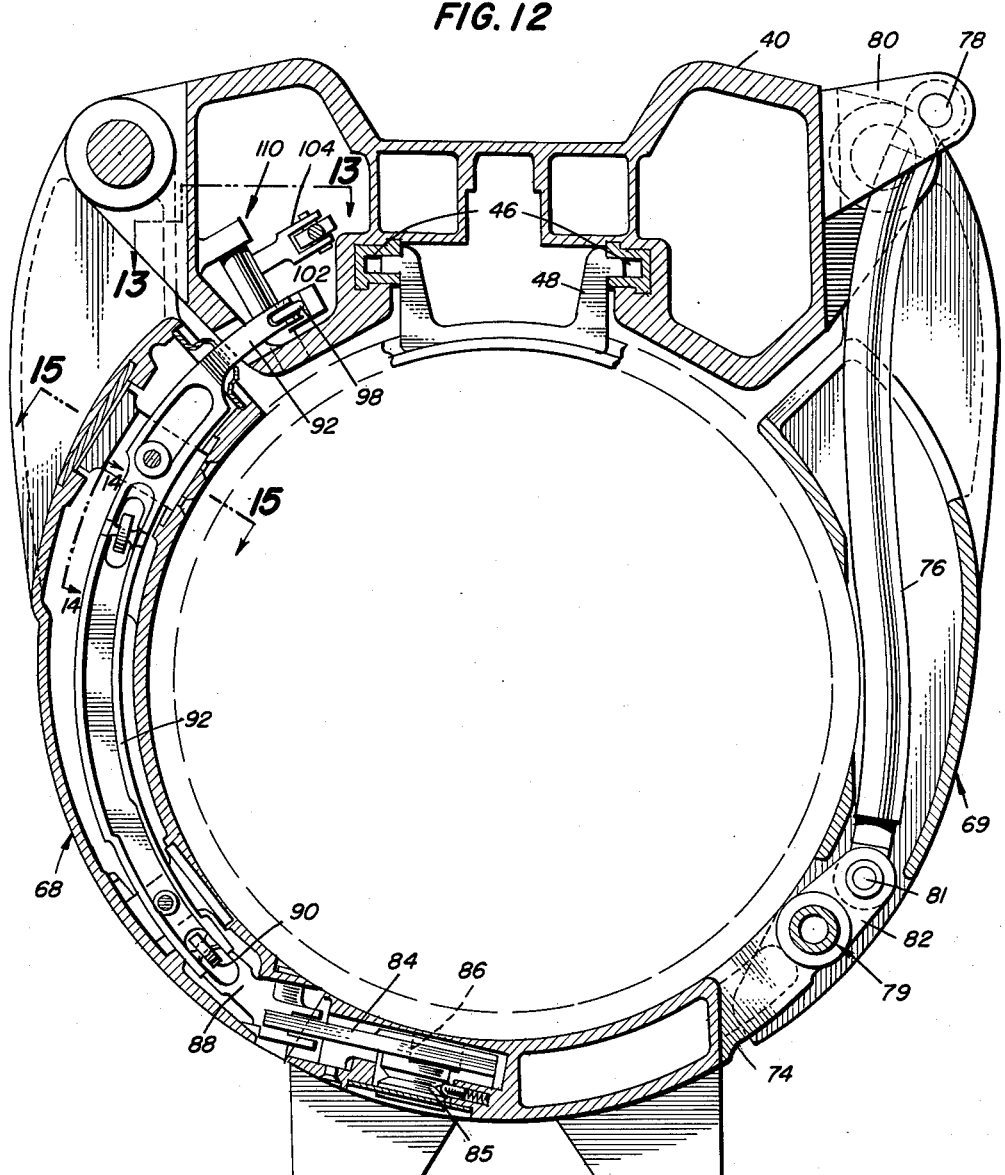
FIG. 12 is a cross section of the adapter rail taken through the forward snubbers.

Referring now to FIGS. 4 and 5, the adapter rail 36 is constructed of a beam 40, preferably of welded steel construction, and has forward and aft shoes 42 and 44 respectively, which shoes simulate those for missiles A and B, mounted on the top surface thereof. These upper shoes 42 and 44 are utilized to support the adapter rail and the missile C in the feeder mechanism 26 and on the launcher arm track 29. Shoe tracks 46, as shown in FIG. 12, for accommodating the shoes 48 of missile C are mounted on the underside of beam 40. A cantilever beam 50 is bolted to the aft end of the beam 40 and contains two connectors 52 and 53 for attaching an umbilical cord 54, as shown in FIG. 8. The umbilical cord provides electrical connections to missile C from both the launcher contactor pad 70 and the loader contactor pad 72. These two pads are positioned on the beam 40 to contact the connectors provided in the system 20 for contacting the missiles A and B. The cantilever beam 50 has a U-shaped groove on its upper side for containing the umbilical cord 54. An aft shoe 45, similar to aft shoe 44, is mounted on the underside of the cantilever beam 50 for handling the adapter rail in the ready service ring.

The missile C is retained on the adapter rail by means of forward and aft snubbers 60 and 62 respectively, which are mounted on the beam 40. The snubbers 60 and 62 are mounted on off-center bearings so that as they close they do not contact the missile until uniform pressure is applied to the whole area of contact. The aft snubber 62 has two arms 64 and 66 which engage the cantilever beam 50 when closed and form therewith a complete lateral enclosure for missile C. The forward snubber 60, as shown in FIGS. 5 and 12, has a right arm 68 and a left arm 69. A connecting arm 74 is hinged to left arm 69 and latches to the right arm 68 to form a complete lateral enclosure for missile C. A forward shoe 43, similar to forward shoe 42, is mounted on the underside of connecting arm 74 for handling in the ready service ring. A curved rod 76 is pivotally mounted by means of pin 78 in clevis 80 which is attached to beam 40. The other end of curved rod 76 is pivotally mounted in clevis 82 by means of pin 81. Clevis 82 is rigidly attached to rod 79 which is rotatably mounted in left arm 69. Connecting arm 74 is rigidly attached to rod 79. Thus, as the left arm 69 is rotated upward, rod 76 will rotate the clevis 82 and rod 79 will cause the connecting arm 74 to fold inward as shown in FIG. 7. This is to permit the adapter rail to be taken back through the blast doors 500 without the necessity of latching the snubbers.

Figure 14:
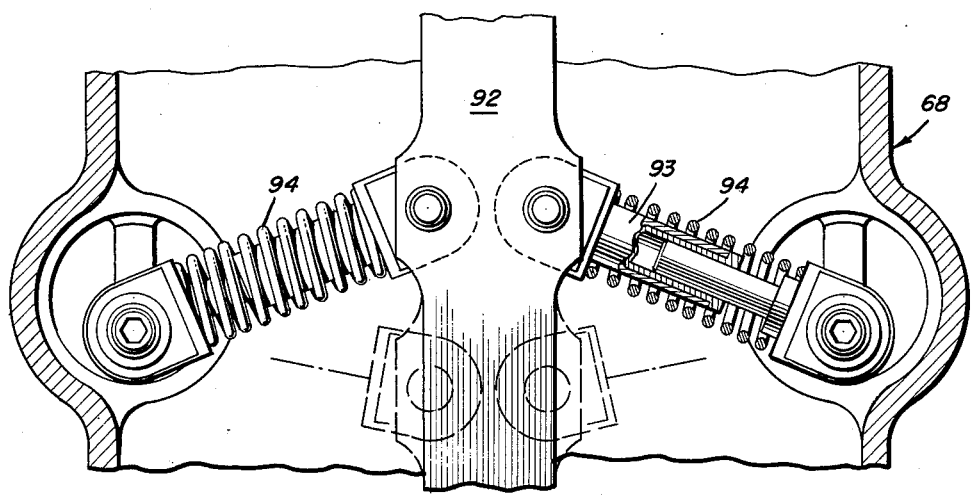
FIG. 14 is a view taken on line 14—14 of FIG. 12 showing the details of the bias means for the push rod.
Figure 15:
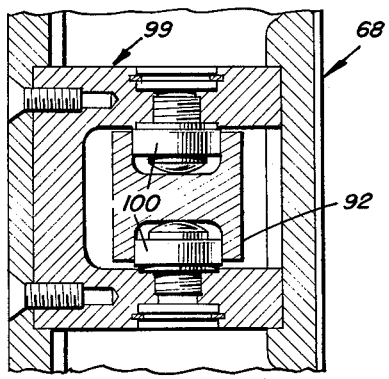
FIG. 15 is a section taken on line 15—15 of FIG. 12 and showing a detail of a typical guide roller arrangement.
Figure 16:
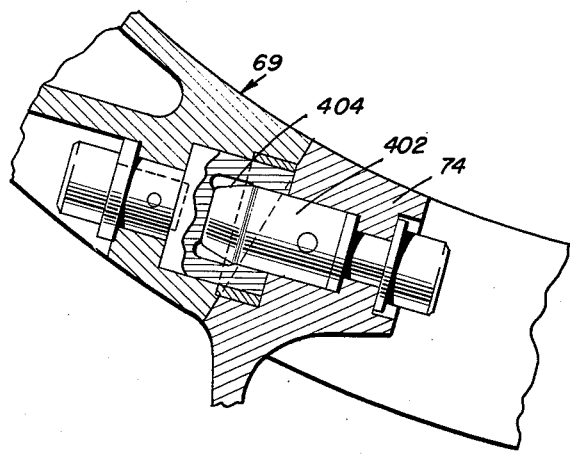
FIG. 16 is a detail view of one of the guide posts on the clamp.

The forward snubber 60 is latched in closed position by means of connecting arm 74 being latched to right arm 68 by latch 91, which comprises a plate 84, see FIGS. 12 and 17 through 20, mounted on take-up cam or roller 86. Plate 84 has a tapered guide portion 39 on one end terminating in notches 87 and a slot 83 in the other end through which cam 86 extends. Cam 86 is eccentrically affixed to a wheel 85 rotatably mounted in connecting arm 74, so that rotation of wheel 85 will cause translation of cam 86 which will cause movement of plate 84. Wheel or pivot 85 is maintained at either the engage or lock position by means of detents. A curved push rod 92, having a roller 98 on its upper end, is slideably mounted in the right arm 68. Push rod 92 is I-shaped in cross section and is provided with guide rollers 100 mounted in units 99 between the walls of arm 68 to support and guide the push rod 92 as it moves. See FIG. 15. Two compression springs 94, shown in FIG. 14, are interposed between the sides of push rod 92 and the right arm 68 and act to keep the push rod in either an extended or retracted position. The rollers 100 and their bushings guide the push rod 92 in all directions except axially. These springs are mounted over telescoping members 93 which are pivotally attached at one end to the right arm 68 and at the other end to push rod 92. The members 93 are located in such a manner that the springs 94 bias the rod upward or downward depending upon whether the points of attachment of the telescoping members 93 on the push rod 92 are positioned above or below the common centerline of the points of attachment of the telescoping member 93 on the right arm 68. At its lower end, push rod 92 is connected to one arm each of a pair of bell cranks 88 by means of links 90, the bell cranks 88 being pivotally mounted on the right arm 68. Rollers 89 are mounted on the other arm of each bell crank. Before closing of the forward snubber is initiated, push rod 92 is in a downward position, as shown in dotted lines in FIG. 14, and is held there by means of the bias of springs 94. Wheel 85 is rotated to its engage position and detented there, as shown in FIG. 17 and indicated by lock position indicator 400 in FIG. 17a, which moves plate 84 toward arm 68. As closing is initiated, by means to be explained hereinafter, right arm 68 approaches connecting arm 74. Rollers 89 clear guide portion 39 and contact plate 84 as shown in FIG. 17 by dotted lines. With further approach of the two arms 68 and 74 the rollers move into notches 87 and pivot the bell cranks 88 which causes the links 90 to be straightened into aligned position as shown in FIG. 18. The springs 94 assist this action once the pushrod 92 reaches a position above the common centerline of the points of attachment of telescoping members 93. Wheel 85 remains unchanged as indicated in FIG. 18a. The straightening of links 90 partially assisted by springs 94 moves the push rod 92 upward to the position shown in FIG. 14. At this point the relative approach of members 68 and 74 stops, leaving a gap therebetween as shown in FIG. 18. Wheel 85 is then rotated to lock position as shown in FIG. 19 and detented there and indicated by the position indicator 400 in FIG. 19a. Rotation of wheel 85 causes cam 86 to move plate 84 away from right arm 68. The springs 94 position the push rod 92 in the upward position shown in FIG. 14 so that links 90 form a straight line and so that the force exerted on the bell cranks 88 by the plate 84 will not permit the cranks 88 to rotate. This results in the right arm 68 and the connecting arm 74 being closed and locked as shown in FIG. 19. A pair of guide posts 402, as illustrated in FIG. 16, is attached to connecting arm 74 and mate with a pair of complementarily positioned guide sockets 404 in right arm 68 to position the two arms 68 and 74 as they approach each other.

Figure 13:
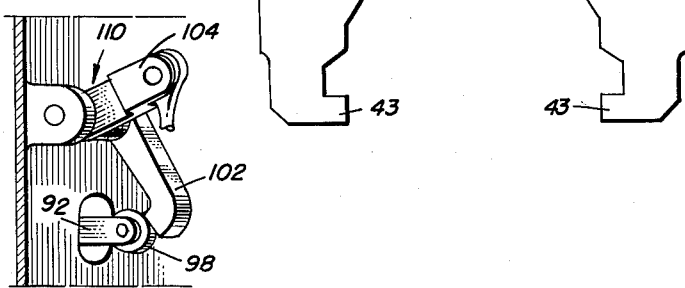
FIG. 13 is a view taken on line 13—13 of FIG. 12 showing the bell crank linkage for the clamp release in the forward snubber.

The forward snubber is unlatched on the arm 28 of the launcher 30 by means of the arming tool, not shown, which is a part of the arm 28. The arming tool engages the arming socket 114 and depresses it releasing the detents and winds or rotates the same clockwise, as viewed in FIGS. 10 and 11. A gear 116 attached to socket 114 is rotatably mounted on beam 40. Gear 116 engages a gear sector 112 and rotates the same about pivot pin 108 mounted on beam 40. A rod 106 pivotally attached to the gear sector 112 by means of pin 109 is moved to the right. A bell crank 110 shown in detail in FIG. 13 is pivotally mounted on beam 40 and has one arm 104 attached to rod 106 by means of a pin and the other arm 102 contacting roller 98 on push rod 92. When the arming socket 114 is rotated clockwise, gear sector 112 is rotated counterclockwise causing rod 106 to rotate bell crank 110. As the crank 110 rotates, arm 102 contacts roller 98 forcing the push rod 92 downward which moves links 90 out of a straight line and allows bell cranks 88 to rotate away from notches 87 and releases the forward snubber 60. All of the operation normally performed by the action of the launcher arming tool may also be performed manually by inserting a wrench into a socket formed into one end of shaft 124 and turning counterclockwise.

A pair of torsion bars 130 shown in FIGS. 4 and 8 are anchored at one end by means of clamps 134 bolted to the aft end of the beam 40 and extended through torque tubes 132 to the forward snubber 60 where the bars are attached, one bar being secured to each of the arms 68 and 69. With the snubbers open, the torsion bars are preloaded to a torque of approximately 55 foot pounds each. The torsion bars 130 have opposite torques preset in them, i.e. the right hand bar has a clockwise and the left hand bar has a counterclockwise torque as viewed from the rear, so that when unlatched the bars will rotate in a counterclockwise and clockwise direction, respectively. The torque tubes 132 are attached to the torsion bars at their forward ends and at their aft ends are attached to the arms 64 and 66 of the aft snubber 62. When the forward snubber is unlatched by action of the arming socket, the torsion bars rotate and open the forward snubber. The torque tubes are also rotated by the action of the torsion bars and open the aft snubber 62. FIG. 6 illustrates the right arm of the aft snubber in open position.

At a point near the aft end, as shown in FIGS. 8 and 21, the torque tubes 132 are connected by a steel band 133 which is wound over the top of the left hand torque tubes and attached thereto and under the bottom of the right hand torque tube and attached thereto. A second steel band 135 is attached at one end to the left hand torque tube. The other end of the second band is pinned to an extension arm 139 connected to a buffer 95.

The buffer 95, shown in detail in FIG. 22, comprises a cylinder 142 having a bore 156 therein. A buffer piston 158 having a reduced section or arm 140 is movable in bore 156. An end cap 143 having a central bore 141 seals off one end of cylinder 142 and retains the piston 158 therein. Arm 140 extends through and is slidable in bore 141. A compression spring 144 is interposed between cap 143 and the piston 158 and urges the same away from the cap 143. Piston 158 and its arm 140 have a bore 151 extending from the end opposite cap 143 substantially but not completely therethrough. An orifice 146 in arm 140 adjacent to the junction of arm 140 and piston 158 connects bore 151 in arm 140 with the bore 156 in cylinder 142. A rod 150 is rigidly attached to and seals off the end of cylinder 142 opposite cap 143. A bore 182 extends substantially but not completely through rod 150 from the end adjacent to the cap 143. The outer surface of rod 150 has control grooves 148 and 152 cut therein. Groove 148 starts at a point adjacent to orifice 146, when the buffer piston 158 is at the limit of its travel away from cap 143, and increases in depth until it merges with the edge of opening 154 which communicates with bore 182 in rod 150. Control groove 152 starts at maximum depth at the edge of opening 154 and decreases in depth until it merges with the outside surface of rod 150. These control grooves 148, 152, and opening 154 determine the acceleration, constant velocity, and deceleration of the snubber arms, as will be explained hereinafter.

Bore 182 in rod 150 is connected by means of orifice 184 to conduit 186 which communicates with a pressure cut-off valve 180 shown in FIG. 23 through conduits 187 and 189. Valve 180 has a valve piston 185 having two lands 181 and 183 movable within a cylinder 191. A compression spring 194 is interposed between the piston 185 and one end of cylinder 191 and urges the piston 185 toward the other end of said cylinder. When the piston 185 is urged to its limit of travel toward the right, as shown in FIG. 23, the space between lands 181 and 183 provides a connection between conduit 187 and by-pass conduit 195 in cylinder 191. By-pass conduit 195 is always in free-flow communication with conduit 188 by means of conduit 193 and a second by-pass conduit 199 also in cylinder 191. Conduit 188 is connected to an accumulator 160 by means of a clearance 200, between a protrusion 202 on piston 158 and a reduced extension 204 on cylinder 142, a second clearance 201 between the protrusion 202 and the bore 203 in extension 204, and conduit 197. The accumulator is of the piston-type and is spring-loaded by means of compression spring 162. To prevent the compressible gas, e.g. air, behind the piston 161 from mixing with the hydraulic fluid in front of it, a flexible diaphragm 164 of gas impervious material, e.g. rubber, extends over the piston face and is attached to the cylinder wall. The diaphragm 164 moves with the piston 161. Hydraulic fluid is replaced in the accumulator through an oil fill inlet 168 mounted on the top thereof.

When the forward snubber is unlatched by the action of the arming socket, as previously described, the torsion bars 130 rotate the arms 68 and 69 of the forward snubber 60 upward. The rotation of the torsion bars 130 causes the torque tubes 132 to rotate and open the aft snubber 62. As the torque tubes rotate, steel band 135 exerts a force on extension arm 139 which causes buffer piston 158 to move toward cap 143 against the bias of spring 144. As buffer piston 158 moves to the left, as shown in FIG. 22, hydraulic fluid contained in bore 156 will be forced through orifice 146 and through control groove 148. Orifice 146 will move with the buffer piston 158 toward the left and will consequently be in direct communication with a progressively deeper portion of groove 148. As the depth of groove 148 increases, the resistance to flow of the hydraulic fluid decreases and the buffer piston will accelerate. As the orifice 146 passes over opening 154, the resistance to flow of hydraulic fluid will remain constant and the velocity of buffer piston 158 will be constant also. Subsequent movement of the buffer piston will bring the orifice in direct communication with control groove 152 which decreases in depth toward the left. The resistance to flow of hydraulic fluid will, therefore, increase and the buffer piston 158 will decelerate. Thus, it will be apparent that the movement of the snubber arms is controlled through a cycle of acceleration, constant velocity, and deceleration because of the controlled movement of the buffer piston 158.

As will be apparent by referring to FIG. 22, the movement of the buffer piston 158 will cause the hydraulic fluid to pass to the accumulator 160 by flowing through orifice 146, control grooves 148 or 152 and opening 154 to bore 182 in rod 150, through orifice 184 to conduit 186, through conduit 186 to conduit 187, between the lands 181 and 183 on valve piston 185 to by-pass conduit 195 and 199 to conduit 193, from there to conduit 188, through clearances 201 into the void formed to the right of moving piston 158 and cylinder 156. As will be apparent by referring to FIG. 22, the void formed to the right of piston 158 is larger than the void to the left of piston 158. Therefore, hydraulic fluid will pass from accumulator 160 through conduit 197 to clearances 200 and 201 to the void forming at the right of piston 158 and cylinder 156.

Once the snubbers 60 and 62 are opened, the buffer piston 158 is moved to the left, as viewed in FIG. 22 and the pump 210 is utilized to return the buffer piston 158 to the right and to close the snubbers. Pump 210 is composed of a handle 206 pivotally mounted in such a manner as to move pump piston 176 within cylinder 170. Pump piston 176 has an axial bore 178 extending from one face to and connecting with a transverse bore 196. A spring-loaded check valve 174 is disposed within bore 178 and permits flow of hydraulic fluid only to the right, as viewed in FIG. 22.

Conduit 188 is connected to the back end of cylinder 170 and has a spring-loaded check valve 172 positioned therein and adjacent said cylinder which permits flow into cylinder 170 only or to the right as viewed in FIG. 22. When the pump piston 176 is moved to the left, as viewed in FIG. 22, check valve 172 remains closed, and check valve 174 opens and fluid is forced through bores 178 and 196 and into conduit 190. Then as the pump piston is moved to the right check valve 172 opens allowing fluid to pass into the back of cylinder 170 and check valve 174 remains closed forcing fluid through conduit 190. Thus, it will be seen that as the pump piston 176 is moved back and forth by movement of handle 206 fluid is pumped from the void behind piston 158, around the clearances 201 and 200, through conduit 188, and through conduit 190 to pressure cut-off valve 180. Conduit 190 is connected to cylinder 191 at a point ahead of the first land 183 when the valve piston 185 is at its limit of travel to the right. The hydraulic fluid entering ahead of land 183 will shift the valve piston 185 to the left, as viewed in FIG. 23, against the bias of spring 194. When the valve piston 185 shifts to the left, the clearance ahead of the first land 183 will provide communication between conduit 190 and conduit 189. Thus, fluid will be pumped from the void behind piston 158 and the accumulator through the conduits, as previously explained, to conduit 186, through orifice 184, through bore 182, through the opening 154, and orifice 146 to the bore 156 in cylinder 142. The increase of fluid pressure in bore 156 will move the buffer piston to the right against the force to the steel band 135 and the torque of the torsion bars 130 exerted on the torque tubes 132. As the piston 158 moves to the right, excess displaced fluid passed into the accumulator. Thus, the arms of the snubbers will be rotated to a closed position. Valve piston 185 has an axial bore 214 with a spring-loaded, pressure relief valve 212 disposed therein. Valve 212 will open when the piston 158 has returned to the right and subsequent pumping increases the pressure beyond the force of the spring in said valve. When valve 212 opens the hydraulic fluid will be routed through bore 214, around valve 212, through internal recess 215 in piston 185, through T-shaped conduit 217 in valve 212 to T-shaped conduit 219 in piston 185 and from there back to the accumulator as will be obvious from FIGS. 22 and 23.

Valve 185 remains positioned to the left by pumping pressure or by pressure in bore 156 created by stored energy in the torsion bars. When the forward snubbers latch, pumping ceases, torsion bar energy is transferred from the buffer piston to the latch, and pressure in the system decays. By spring force and leakage, valve 185 moves to the right thereby opening line 187 to accumulator and closing line 189. Now the system is ready for a snubbers open cycle.

Figure 24:
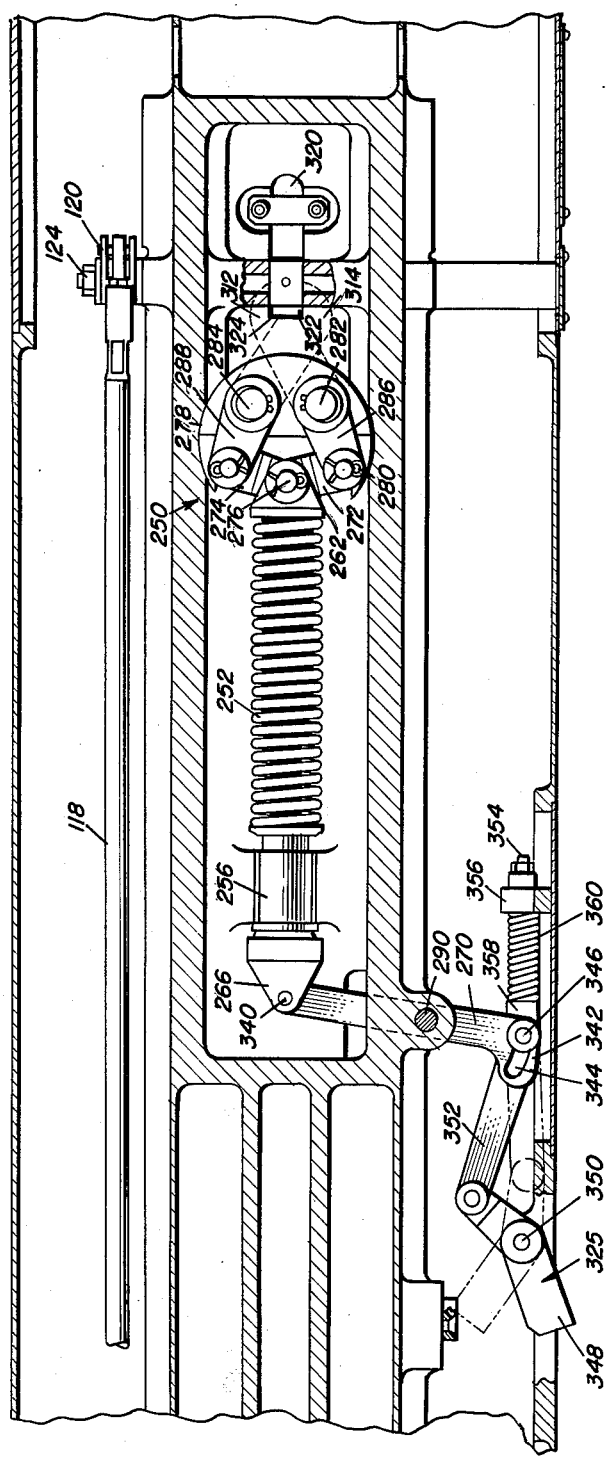
FIG. 24 is a horizontal section of the central portion of the adapter rail and showing the missile restraining mechanism.
Figure 28:
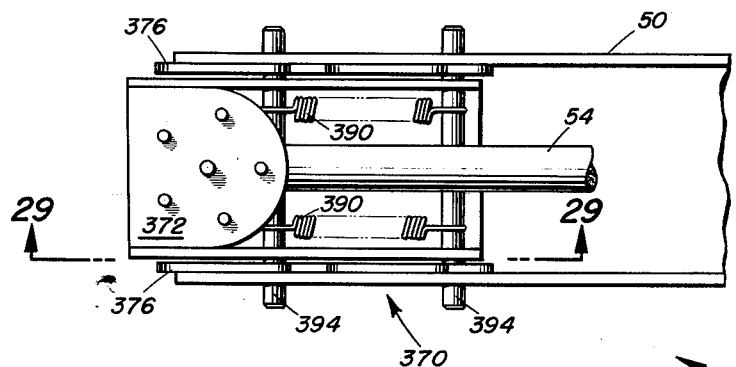
FIG. 28 is a top plan view of the umbilical disconnector.
Figure 29:
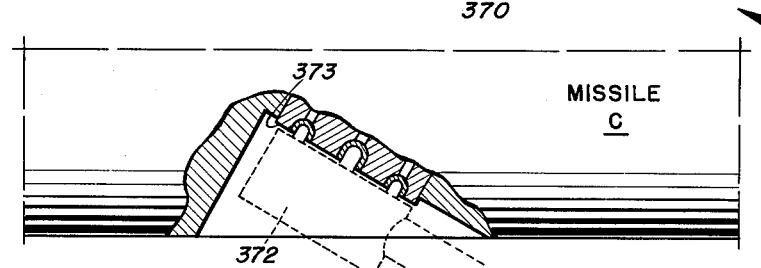
FIG. 29 is a composite section taken on line 29—29 of FIG. 28 and showing the relationship of the umbilical disconnector to the missile during strikedown.
Figure 30:
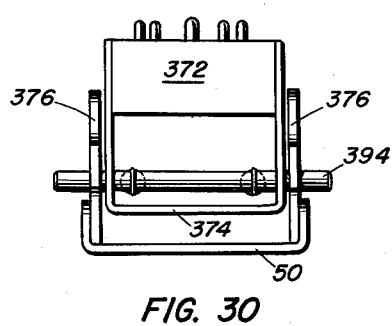
FIG. 30 is a vertical elevation taken on line 30—30 of FIG. 29 showing the umbilical disconnector.

A restraining latch 250, shown in FIGS. 24 and 25, is provided on the beam 40 to engage and hold the aft shoe on missile C. Restraining latch 250 comprises a compression spring 252 mounted over a sleeve 254 which is slidable in a housing 256 attached to beam 40. A rod 258 is mounted in the sleeve 254 and has a clevis 260 integral with the right end as viewed in FIG. 25. A shoulder 262 is formed on the rod 258 at its juncture with the clevis 260 and bears against spring 252. An enlarged washer 264 is mounted on the sleeve 254 between housing 256 and clevis 260 and bears against the other end of spring 252.

An enlarged head 266 is threadedly attached to the right end of rod 258 as viewed in FIG. 25 and by bearing against housing 256 limits the movement of the sleeve and rod to the right. The sleeve 254 is of such length that it bears against both the shoulder 262 and head 266 and is, therefore, not movable relative to the rod 258.

A pin 276 extends through the clevis 260 and pivotally mounts two links 272 and 274 on the clevis. Links 272 and 274 are connected by means of pivot pins 280 and 278 to arms 286 and 288 respectively. The arms 286 and 288 are respectively keyed to shafts 282 and 284 which are rotatably mounted in bearings affixed to beam 40. Latch pawls 312 and 314 are integral with or rigidly attached to the lower end of shafts 282 and 284. Pawls 312 and 314 have projections 316 and 318 respectively which engage and restrain the aft shoe of missile C, as shown in FIGS. 26 and 27.

When the missile C is fired, the thrust will act against projections 316 and 318 and exert a moment on pawls 314 and 312 which tends to rotate them inward on the shafts 282 and 284. However, the spring 252 acting on shoulder 262 forces the clevis 260 and pin 276 to the right, as viewed in FIGS. 25 and 26. The spring force, therefore, exerts a moment, through links 272 and 274 to arms 286 and 288 and by shafts 282 and 284, on the pawls 312 and 314 which tends to force them in an outward direction. Thus, the missile C cannot be launched until the thrust exceeds the force of the spring 252, at which point the pawls will be rotated inward and the missile shoe can pass the projections 316 and 318.

A safety latch, operated by rotation of the arming socket, is provided to prevent the pawls from moving inward before the missile is fired. This safety latch comprises a latch block 320, shown in FIGS. 9, 25, and 26, rigidly attached to a shaft 124 which is rotatably mounted in beam 40. An arm 120 is rigidly attached to shaft 124 and pinned to one end of rod 118. The other end of rod 118 is pinned to gear section 112 by means of pin 109. Rotation of the gear section by the arming tool, as previously described, will move rod 118 to the right as viewed in FIG. 10. Rod 118 will pivot arm 120 to the left and rotate shaft 124. Latch block 320 will, therefore, be pivoted out of notches 322 and 324 in pawls 314 and 312 and permit them to pivot inward.

A manual release 325 shown best in FIGS. 9 and 24 is provided on the beam 40 for retracting projections 316 and 318 on pawls 312 and 314 to permit a missile type C to be loaded onto the adapter rail. The release 325 comprises a bar 270 pivotally mounted at a point intermediate of its ends to beam 40 by means of pin 290. The bar 270 is pivotally pinned at one end to head 266 by means of pin 340 and has a clevis 342 formed integral with its other end. A curved slot 344 is provided in clevis 342 through which a pin 346 extends. A bell crank 348 is pivotally mounted on beam 40 by means of pin 350. One arm of the bell crank is pivotally pinned to a link 352. A rod 354 is secured to beam 40 by means of member 356 and has a clevis 358 on one end. A compression spring is mounted over rod 354 between member 356 and clevis 358 and urges the rod 354 toward the left as viewed in FIG. 24. The pin 346 extends through the slot 344 in clevis 342 and is rotatably secured in the clevis 358 on the rod 354 and the link 352. The slot 344 permits the bar 370 to rotate when the release mechanism 250 is operated normally. However, when it is desired to operate the release mechanism manually, the protruding arm of the bell crank is pushed inward to the dotted position shown in FIG. 24. This causes the link 352 to move the pin 346 to the right and to compress spring 360. Since the link 352 moves beyond center, the bell crank 348 is held in this position. The pin 346 will exert a force on the right edge of the slot 344 and consequently, will pivot the bar 270 about the pin 290. The head 266 will be moved to the left retracting the rod 258 and compressing the release spring 252. Movement of the rod 258 will rotate projections 316 and 318 out of the path of the aft lug for the missile C, through the linkage means previously described.

An umbilical cable disconnector 370, as shown in Figs. 4, 28, 29, 30, and 31, is attached to the free end of cantilever beam 50. The umbilical disconnector is necessary to break the physical electrical connection between the missile C and the adapter rail 36. As the missile C is launched, the missile C moves relative to the adapter rail 36 and some means must be provided to remove the electrical connection that was provided between the rail and missile. An electrical plug 372 engages a complementary electrical socket or receptacle 373 contained within and integral with the missile C. The plug 372 is connected through 54 to previously mentioned connectors 52 and 53 to provide electrical warmup and check out to the missile C from the contactor pads 70 and 72 on rail 36 which pads are positioned on the rail to simulate the contactors on the missiles A and B, for which the system 20 was designed. To provide a means for disconnecting or interrupting the electrical connection, two plates 376 are vertically mounted on the outer edges of the cantilever beam 50. The plates 376 have a V-shaped groove 378 with an overhanging lip 379 near the rear portion thereof and a slot 380 in the central portion thereof. The plates are also provided with an overhanging lip 382 on the front portion thereof. The bottom of the plug 372 has attached thereto a substantially U-shaped member 374. A cross member 396 is rigidly attached to the U-shaped member 374. A second cross member 394 is slideably retained within a pair of slots 392 in member 374. A pair of tension springs 390 are fastened between the two cross members 394 and 396 and bias the second cross member 394 toward the back of slots 392 or toward the rigid cross member 396.

The operation of the umbilical cable disconnector is illustrated in Figs. 32 through 35. The plug 372 is manually positioned as shown in Fig. 32 before a missile type C is loaded onto the adapter rail 36. The horizontal position keeps the plug 372 out of the way of the missile body. After the missile type C has been loaded onto the adapter rail 36, the plug 372 is manually inserted in socket or receptacle 373 and the rigid cross member 396 is located within the V-shaped groove 378 and below the overhanging lip 379. As the missile C moves relative to the adapter rail 36 upon launching, the rigid cross member 396 contacts the forward edge of V-shaped groove 378 stopping motion of plug 372. Further motion of the missile C disconnects the plug 372 from the socket 373 in the missile C. Upon still further motion of missile C, surface 501 contacts plug 372 and cams movable crossmember 394 over overchanging lip 362 forward against the bias of the springs 390 until the member 394 clears the lip 382. The springs 390 then pull the member 394 under the overhanging lip 382 and lock the plug 372 in a horizontal position removed from the path of the missile. Because parts of the connector are destroyed by the missile's rocket motor blast, an umbilical cable 54 is expended with each missile launching and must be replaced.

Obviously many modifications and variations of the present invention are possible in the light of the above teachings. It is therefore to be understood that within the scope of the appended claims the invention may be practiced otherwise than as specifically described.

What is claimed is:

1. A device for adapting a first type of missile for processing through a missile launching system designed for launching a second type of missile of another size comprising;

a launcher arm forming a part of the basic launching system and including track means for supporting and guiding a missile of the second type, an adapter beam having shoe means thereon insertable into said track means for removably supporting said adapter beam on said launcher arm, snubber means mounted on said adapter beam and movable between a closed position in which the first type missile is secured thereby and an open position removed from the first type missile, bias means on said adapter beam and connected to said snubber means for urging said snubber means toward said open position, latch means on said snubber means for latching said snubber means in said closed position, and release means on said beam and connected to said latch means for releasing the same whereby said bias means will move said snubber means to said open position.

2. The device according to claim 1 further comprising:

a restraining means on said adapter beam for engaging the first type missile and preventing forward movement of the first type missile relative to said beam.

3. The device according to claim 2 and further comprising;
   a safety means mounted on said adapter beam and movable between a first position in engagement with said restraining means for rendering said restraining means inoperative and a second position removed from said first position,
   and linkage means on said adapter beam connecting said safety means to said release means whereby said safety means will be moved to said second position in response to actuation of said release means.

4. The device according to claim 1 and further comprising;
   buffer means mounted on said adapter beam and connected to said bias means for controlling the movement thereof whereby said snubber means is permitted to progressively move through acceleration, constant velocity, and deceleration as said snubber is moved to said open position.

5. The device according to claim 1 in which said snubber means comprises;
   a pair of snubber arms hingedly attached on each side of said adapter beam,
   a connecting arm hingedly connected to one of said snubber arms and engageable with the other of said snubber arms.

6. The device according to claim 5 and further comprising;
   a rod pivotally attached at one end to said adapter beam,
   a link rigidly attached to said connecting arm and pivotally attached to the other end of said rod whereby as said snubber means is moved to said open position said connecting arm will be folded in toward said one snubber arm.

7. The device according to claim 1 in which said snubber means comprises;
   a pair of aft snubber arms hingedly connected to said adapter beam,
   a pair of forward snubber arms hingedly attached to said adapter beam,
   and a connecting arm hingedly connected to one of said forward snubber arms and engageable with the other of said forward snubber arms.

8. The device according to claim 7 in which said bias means comprises;
   a pair of torsion bars rigidly attached at one end to said adapter beam and connected at the other end thereof to said forward snubber arms,
   and a pair of torque tubes rigidly connected to said other end of said torsion bars, said torsion bars being prestressed in torsion for biasing said forward snubber arms toward said open position whereby said torsion bars will rotate said torque tubes to bias said aft snubber arms toward open position.

References Cited by the Examiner
UNITED STATES PATENTS

| | | | |
|---|---|---|---|
| 2,659,274 | 11/53 | Lauritsen | 89—1.7 |
| 2,809,559 | 10/57 | Lauritsen | 89—1.7 |
| 2,826,120 | 3/58 | Lang et al. | 89—1.7 |
| 2,877,688 | 3/59 | Markil | 89—1.5 |
| 2,960,009 | 11/60 | Hereth et al. | 89—1.7 |
| 2,985,443 | 5/61 | Smith | 267—1 |
| 3,008,377 | 11/61 | Bronson | 89—1.5 |
| 3,027,152 | 3/62 | Deschner | 267—1 |
| 3,038,383 | 6/62 | Von Tiesenhausen | 89—1.7 |
| 3,040,629 | 6/62 | Duncan et al. | 89—1.7 |
| 3,072,021 | 1/63 | Marcon | 89—1.7 |
| 3,093,031 | 6/63 | Damm | 89—1.5 |
| 3,106,132 | 10/63 | Biermann et al. | 89—1.7 |

SAMUEL FEINBERG, *Primary Examiner.*

BENJAMIN A. BORCHELT, SAMUEL W. ENGLE,
*Examiners.*